United States Patent [19]
Sangster

[11] 3,834,484
[45] Sept. 10, 1974

[54] ANTI-THEFT DEVICE FOR INTERNAL COMBUSTION ENGINES

[76] Inventor: Arlon G. Sangster, Sterling, Mass. 01564

[22] Filed: Apr. 5, 1972

[21] Appl. No.: 241,354

[52] U.S. Cl............ 180/114, 70/243, 123/198 DB, 137/384.4, 137/613, 307/10 AT, 340/52 D, 340/64
[51] Int. Cl............................................ B60r 25/04
[58] Field of Search .. 180/114; 123/198 B, 198 DB; 340/63, 64, 52 D; 70/242, 243; 137/384.4, 613, 583; 307/10 AT

[56] References Cited
UNITED STATES PATENTS

| | | | |
|---|---|---|---|
| 1,208,480 | 12/1916 | Casey | 123/198 B |
| 2,598,056 | 5/1952 | Hollins | 340/52 D |
| 3,630,306 | 12/1971 | Shur | 180/114 |
| 3,653,457 | 4/1972 | Lopez | 180/114 |
| 3,670,836 | 6/1972 | Tonkowich | 180/114 |
| 3,718,202 | 2/1973 | Brock | 180/114 |

Primary Examiner—David Schonberg
Assistant Examiner—John P. Silverstrim
Attorney, Agent, or Firm—Charles R. Fay

[57] ABSTRACT

A keyboard with a plurality of push buttons thereon is mounted in the driver's compartment and is connected by push rods to a new and improved valve mechanism in the fuel line adjacent the carburetor. The valves are arranged to operate only in a predetermined code to allow gas to flow when the ignition switch is turned to "on" position.

A solenoid is de-energized to move the valves canceling the code when the ignition is turned off, and even though this sole electric part of the device should fail, the operation of the vehicle would be the same as though the theft-proof device were not present.

Means is also operable to prevent the cancellation of the code at the operator's will, so that the vehicle can be operated as normal.

7 Claims, 12 Drawing Figures

TO VACUUM OR FUEL PUMP PRESSURE

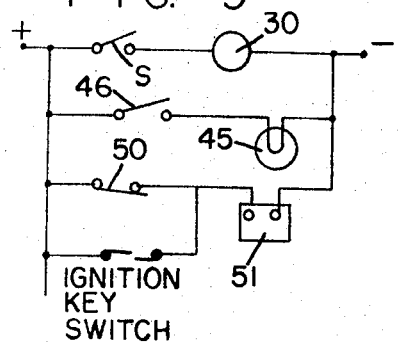
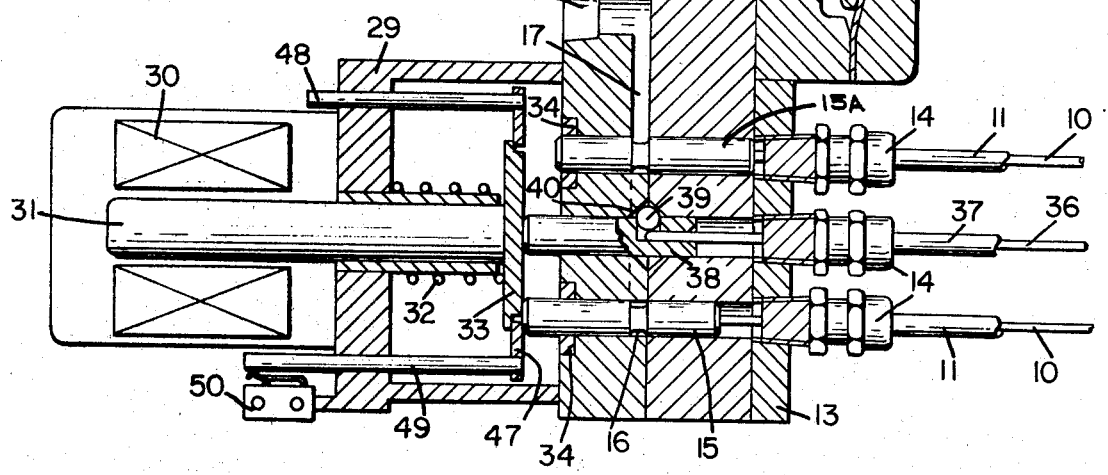
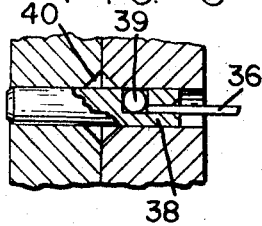
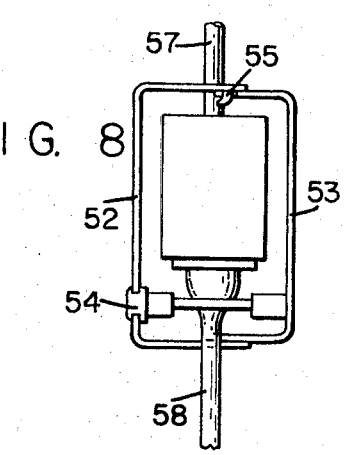
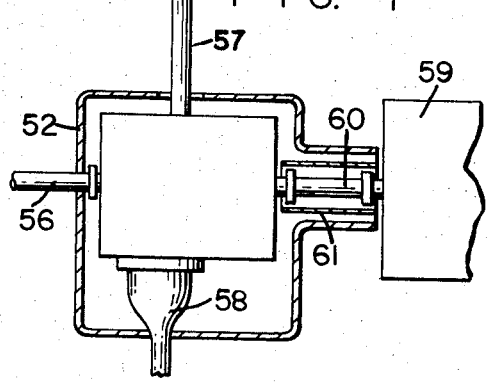
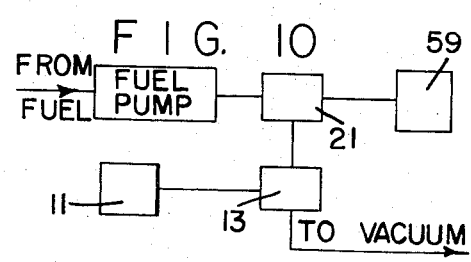

ANTI-THEFT DEVICE FOR INTERNAL COMBUSTION ENGINES

BACKGROUND OF THE INVENTION

The theft of automobiles is a well known problem. One skilled in auto theft can easily obtain certain master keys of any of the well known manufacturers which will operate most of the vehicles made by such manufacturer. Also of course it is simple enough to cross the ignition wires and thereby start the engine without a key. One solution to the problem is to provide a key operated lock for the steering wheel but the same objection as to the number of keys available obtains here too although of course the shorting of the ignition switch type of theft is overcome, since the vehicle can only operate in a single line with the steering column locked. There have been many other proposals for anti-theft devices but they are ordinarily too complicated and expensive and in many cases too cumbersome to install and operate, and some may cause confusion to the operator, so that by and large there have been no successful anti-theft devices commonly available with the exception of the steering column lock device.

It is the principal object of the present invention to provide a very simple, inexpensive and easily installed and operated anti-theft code device for the purpose described.

SUMMARY OF THE INVENTION

A keyboard is mounted in convenient location in the driver's compartment. This keyboard may have as many pushbuttons thereon as is thought to be desirable. It also has a cancellation for the code and a cancellation override.

A device is mounted on or adjacent to the carburetor with a plurality of valves therein and these valves are individually operated mechanically through pusher-rods by the pushbuttons. These valves are arranged so that the code forming pushbuttons must be pushed and the other pushbuttons must not be pushed in order for gasoline to flow fully to the carburetor in the usual manner. These valves are in the fuel line and there are two arrangements of the pusher-rods, one where the fuel is directed through the valves and the other where the valves act in a pilot vacuum or pressure line which in turn is connected to the fuel line.

A solenoid-held spring returned operated device is utilized to return the mechanically operated valves to original position when the ignition is cut off.

The result is that the engine can be turned on with a key or by shorting the ignition switch but only so much gasoline will be burned as already exists in the carburetor. Any one of the aforementioned valves blocks off the gasoline if it is not in its correct position.

The code can be changed at any time in a very simple manner and the valve return is operated by the de-energization of an electrical device which has no other function. If it fails or the wire that leads to it is disrupted, the vehicle can be operated in the usual manner, providing the proper code buttons are operated.

Due to the cancellation override, the vehicle can be garaged and the garage attendant can move the car in the usual manner without attention to the code and without being apprised of the code.

BRIEF DESCRIPTION OF THE DRAWINGS

FIG. 5 is a sectional view of the valve mechanism;

FIG. 6 is a partial view of the valve lock mechanism;

FIG. 7 is a sectional view of the valve mechanism enclosure;

FIG. 8 is a sectional view of the valve enclosure;

FIG. 9 is an electrical diagram;

FIG. 10 is a schematic of the complete mechanical arrangement; and

PREFERRED EMBODIMENT OF THE INVENTION

Figure 1:
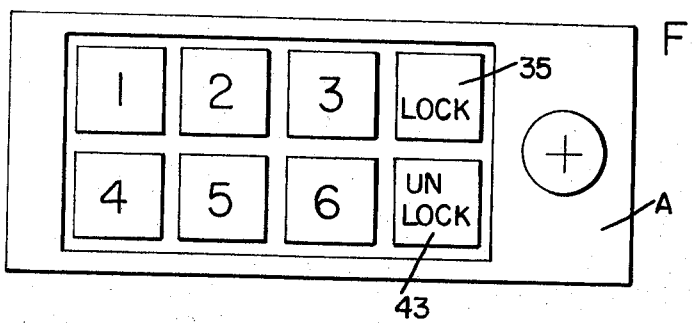
FIG. 1 is a front view of the operator's push button assembly.
Figure 2:
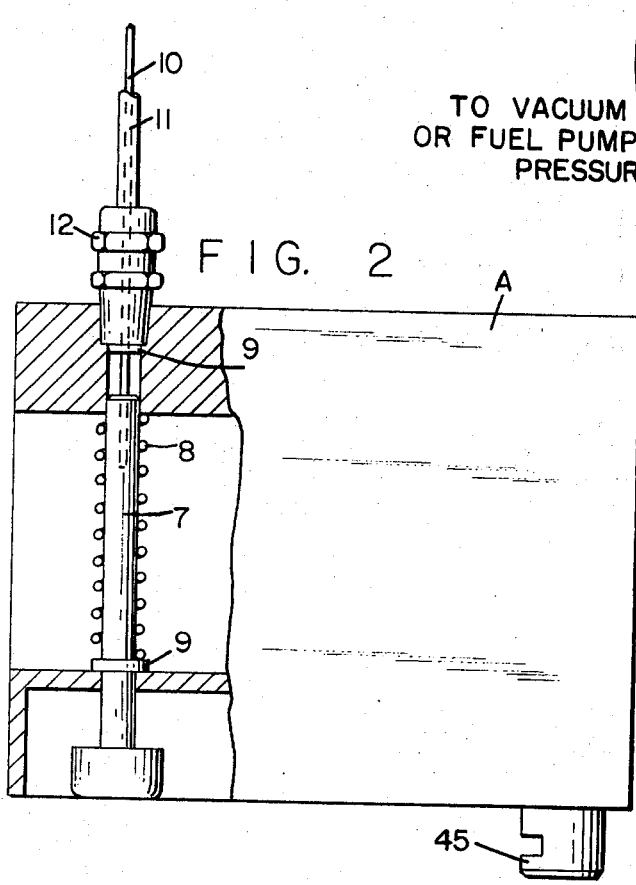
FIG. 2 is a sectional view of a push botton rod mechanism.
Figure 3:
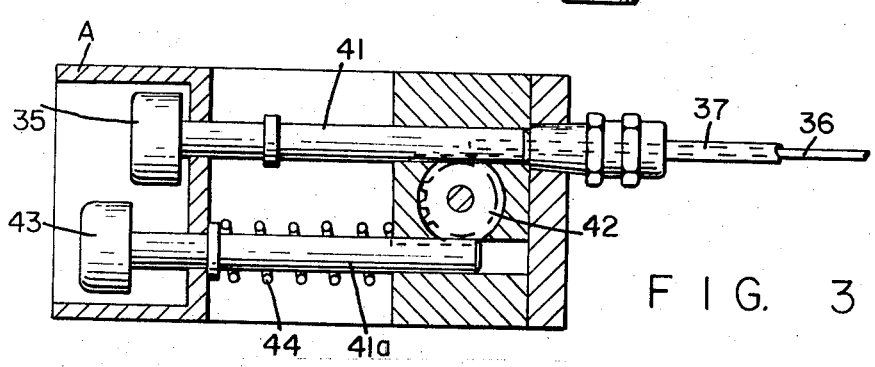
FIG. 3 is a sectional view of the lock and unlock rod mechanism.

The novel device comprises two major elements: a push button key-board assembly A, FIGS. 1, 2, and 3, this assembly having a number of manually operated, spring restored buttons, each having, on its face, a number or designation; and a valve assembly B, FIG. 5, comprising the same number of valves as there are numbered push button. The push button assembly is preferably mounted on or below the dashboard within convenient reach of the operator of the vehicle and the valve assembly is preferably located under the hood of the vehicle adjacent to or on the carburetor.

Each of the numbered push buttons, 1, 2, 3, 4, 5, 6 (FIG. 1) is on a rod 7 and is free to move against the action of a return spring 8, this motion being limited by the appropriate stops 9, 9, in each direction. Attached to each rod 7 there is a flexible rod 10 which is free to slide in a flexible tube 11 the end of which is secured to the push button assembly by a suitable fitting 12. Manual depression of any button causes its rod 10 to move in the tube.

Figure 4:
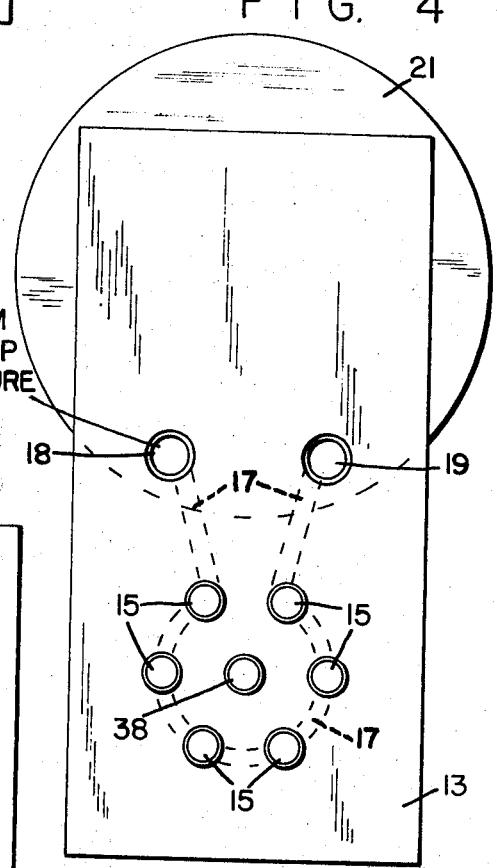
FIG. 4 is a view showing the positions of the valve spools.

The opposite end of each tube 11 is secured to the valve housing 13 (FIG. 5) by a suitable fitting 14 and each rod 10 impinges on a cylindrical valve spool 15 which is free to move a limited amount along its axis in corresponding bores in valve housing 13. There is one valve spool for each numbered push button and rod and tubing, and each spool has an annular groove 16 intermediate its end. The position of each groove 16 is such that it is aligned with a partially circular groove 17 in the valve body 13, FIG. 4. When the buttons and rods have not been operated, or if the valve spools are turned end for end, grooves 16 will align with the groove 17 in valve body 13 only if the associated rod and push button have been pushed. When all of the grooves 16, 16 are aligned with the groove 17, an opening is thereby made to allow vacuum, from the vacuum system of the vehicle, to be connected between port 18 and port 19 in valve body 13, FIG. 4.

Port 19 is connected to a port 20 of a diaphragm valve assembly 21 which can be conveniently mounted on valve body 13, and consists of a diaphragm 22, a piston 23, a return spring 24, a stem 25, and a valve 26. This diaphragm valve, with vacuum applied to port 20 through ports 19 and 18, controls the flow of fuel from the usual fuel pump which is connected to a port 27, through to the usual carburetor connected to port 28. As an example, if all of the valve spools are positioned as shown at 15A in FIG. 5, the operation (push) of any button blocks the vacuum connection and renders the diaphragm valve 21 inoperative thereby shutting off the flow of the fuel to the vehicle engine. In like manner, if all of the push buttons were depressed, then vacuum would be connected to the diaphragm valve 21, which would then be operated to allow fuel to flow to the vehicle engine.

A housing or frame 29 mounts a solenoid coil 30, a solenoid plunger 31, a spring 32 which works against the action of the solenoid, and a plate 33 attached to the solenoid plunger 31. This is attached to the valve body 13 e.g. by two thumb screws (not shown) and can be removed without the use of tools. When removed, access may be had to valve spools 15, 15A, so that any or some or all of the spools may be removed and replaced with the groove in adjusted position with respect to the operating rods 10, 10. Any valve spool having its groove closer to its associated operating rod must be moved by the action of its rod and push button in order to allow the vacuum connection to be made; and in like manner, any valve spool having its groove further from the push rod must not be operated in order for the vacuum connection to be made. Therefore a code can be created, wherein certain buttons must be operated and the remaining buttons must not be operated in order to create a connection to the diaphragm valve from the vacuum line, as described. Washers 34 apply a drag to the individual spools and retain them against vibration.

The solenoid coil is connected to the vehicle ignition switch 34, (FIG. 9) and the operation of the solenoid moves the plunger 31 and plate 33 against spring 32 to allow any valve spool to remain in a disposed position if it has been operated by its associated push button. When the ignition is turned off, solenoid coil 30 is de-energized and the spring 32 moves the plunger 31 and plate 33 to move all the valve spools toward the push rods 10, thereby cancelling the code and interrupting the vacuum connection to diaphragm valve 21, in turn closing valve 26 and closing the connection between the fuel pump and the carburetor.

One of the push buttons as at 35, FIG. 1, is labelled "lock" and its associated flexible rod 36 housed in flexible tube 37, has, on its distal end a sliding fit in an axial bore in a plunger 38, which has also a lateral recess accepting a loose ball 39, see FIG. 6. In the position shown, the action of pushing button "lock" 35 causes the plunger 38 to move along its axis until the ball 39 can move into a closed groove 40 in the frame 13, groove 40 circumferentially surrounding the plunger. This motion serves to lock plunger 38 in an extended position against plate 33 preventing plate 33 from moving under the action of spring 32.

This serves two purposes: a, to prevent the de-energization of the solenoid from cancelling the code once it has been put into the valve, and b, to force the plate 33 and the plunger back against spring 32 thereby allowing a code to be set into the valve even in the event of a failure of the solenoid. There is no return spring on the lock push button plunger 38.

There is also an "unlock" push button 43 having a return spring 44, FIG. 3. This is connected to the "lock" rod 41 by means of a pinion 42 which engages a section of rack teeth cut into rods 41 and 41a and these rods being on the push buttons 35 and 43 respectively. Depressing the "unlock" button will cause the "lock" plunger 41 to be restored and cause rod 36 to be withdrawn from plunger 38, allowing spring 32 to move plate 33 to restore all the operated valve spools. The code can be thus locked and inhibited, so that the vehicle can be operated in a normal fashion as if there were no anti-theft device present. Operation of the "lock" button does not disclose the code in any way. Lamp 45, FIG. 9, is arranged to shine on the push buttons and serves to illuminate these buttons at night providing the vehicle parking light switch 46, FIG. 9, is operated.

A ring 47 is affixed to slide rods 48 and 49 slidably mounted in housing 29. Operation of any code valve spool, 15, 15, moves this ring and slide rods parallel to the motion of the solenoid but independent of the solenoid motion, causing rod 49 to operate limit switch 50. This switch is connected to the vehicle key buzzer 51 and does not allow the buzzer to be de-energized until one of the numbered code buttons have been operated. This serves to remind the operator to operate the code push buttons when starting the vehicle. Since the operation of the device interrupts the flow of fuel to the vehicle engine, the buttons can be operated at any time before the fuel in the carburetor bowl has been exhausted. In the same manner, anyone attempting to operate the push buttons by trial and error must expend this fuel at each trial before knowing that the wrong code has been pushed.

As shown in FIGS. 7 and 8, the valve assembly may be housed in a steel enclosure having a cover 52 and case 53, both parts being held together by a lock 54, preferably of the high security type, and one or more pins 55. The case has openings to admit the fuel line 56 from the fuel pump, a vacuum line 57, and the tube and wires 58 from the push button station. The valve assembly is preferably mounted as close as possible to the carburetor 59 and connected by steel tubing 60. A piece of hardened steel tubing 61 is mounted around this connecting line and is free to rotate. In the event that access is attempted by use of a hack saw, this tube will rotate under the influence of the saw and resist easy severing of this connection. A preferable embodiment of the invention would be to have the valve assembly constructed as an integral part of the carburetor.

Figure 11:
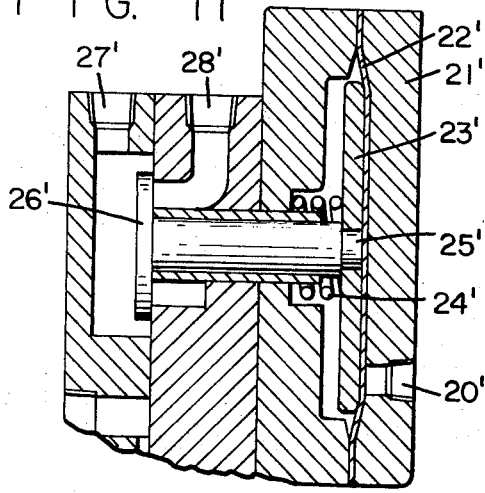
FIGS. 11 and 12 illustrate a minor modification.

In FIG. 11 there is shown a pressure operation of the diaphragm 22' instead of the vacuum system. Merely by connecting port 18 to the fuel pump pressure instead of to the vacuum, and by connecting port 19 to port 20' in FIG. 11, the diaphragm can be pressure operated. The numerals 21' to 28' in FIG. 11 represent equivalent parts to numerals 21 to 28 in FIG. 5, except for the port 20'.

Figure 12:
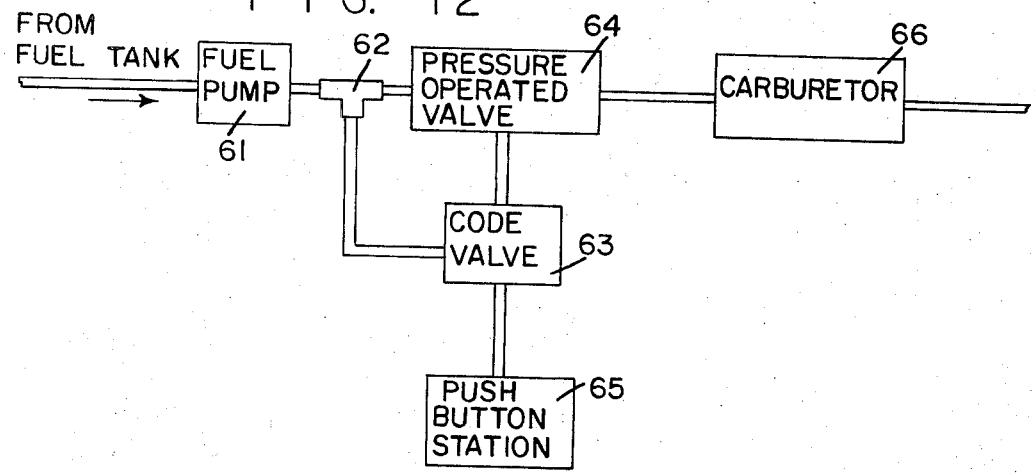

FIG. 12 is a diagram of the valve wherein the source of pilot pressure to the code valve is from the fuel pump. A tee 62 is placed in the line from the fuel pump 61 to the code valve 63 to provide pressure to operate the diaphragm valve which, when operated opens the valve connecting the fuel line through the pressure operated valve 64 to allow fuel to flow to the carburetor. The push button station 65 operates the code valves in the manner described before.

In order to assure a supply of vacuum required to operate the vacuum diaphragm valve, it may be necessary to install in the vehicle a sequence valve which would allow vacuum to be delivered only to the code valve until the vacuum exceeded some value greater than that required to operate the diaphragm valve. This would assure that sufficient vacuum was available to start the vehicle in the event that the carburetor had been exhausted of fuel by an attempt to start the vehicle without operating the code valve.

The advantages of this unit are e.g.:
1. Low cost,
2. Highly reliable with few parts, all essential elements being mechanical,
3. Code can be changed easily and quickly without tools,
4. Code can be locked into unit without disclosing code,
5. There is no immediate reaction to a wrong code thereby making trial and error solutions difficult, and
6. There is ample time to insert code when starting vehicle.

I claim:

1. Anti-theft device for internal combustion engines having a carburetor, source of fuel, ignition switch, battery, said device comprising a plurality of activators adapted to be manually actuated, a plurality of valves, means to operate each valve separately by an activator, said valves having selective combined positions causing blocking of the fuel supply to the carburetor and opening the same, certain valves being normally in fuel supply blocking position, whereby such blocking valves must be actuated by said means to allow fuel flow, the ignition switch being independent of said valves and said actuators, and the activators comprising flexible elongated members between the said means and the valves, a reset for the valves, means to actuate the reset upon opening of the ignition switch, cancellation means for the reset, ensuring that all valves are open upon opening of the ignition switch, means to inactivate the cancellation means, wherein the cancellation means comprises a movable plunger, an axial bore partway therein from an end thereof, a lateral recess in the plunger communicating with the recess, a laterally movable element in the recess, a rod in the bore engaging the movable element, means forming a bore receiving the plunger for slidable motion toward and away from the reset to lock the same and selectively to release it, an opening in the bore forming means to receive the element and lock the plunger in reset locking condition, the rod moving the plunger and element to reset locked condition and holding the same until retracted.

2. Anti-theft device for internal combustion engines having a carburetor, fuel tank, battery, vacuum supply, a pressure supply, and ignition switch, said device comprising a push button assembly including a plurality of push buttons, a valve assembly, a passage for one of said supplies, a device operable by one of said supplies through the passage, a valve for fuel to the carburetor, said last-named device being connected to the fuel valve to open and close it, a plurality of movable valve bodies in the passage, each of these valve bodies having a transverse passage therein, each valve body having a position closing the passage and a position aligning its transverse passage with the passage so that the last-named device operates to open the fuel valve only when all the valve body transverse passages are aligned with the passage, a flexible rod connecting each push button to its respective valve body for motion of the latter by the former at will, certain of the valve bodies normally being positioned to align the transverse passages thereof with the passage and when actuated misaligning the same to close the passage, and certain of the valve bodies normally being positioned in misaligned condition relative to the passage and when actuated opening the same.

3. The anti-theft device of claim 2 including an electrically operated device returning all valve bodies to normal position upon de-energization thereof.

4. The anti-theft device of claim 2 wherein the transverse passages in the valve bodies are non-uniformly positioned.

5. The anti-theft device of claim 4 wherein the valve bodies are reversible end to end.

6. The anti-theft device of claim 3 including means to cancel the operation of the valve body return device, and a push button to manually activate the cancelling means.

7. The anti-theft device of claim 6 including means to inactivate the cancelling means, and a push button to manually operate the same.

* * * * *